US006747860B2

United States Patent
Braiman

(10) Patent No.: US 6,747,860 B2
(45) Date of Patent: Jun. 8, 2004

(54) POWER-SUPPLY FEEDTHROUGH PROTECTION CIRCUIT FOR 5-VOLT FAILSAFE CMOS DRIVERS

(75) Inventor: Michael Braiman, Windsor, CO (US)

(73) Assignee: LSI Logic Corporation, Milpitas, CA (US)

( * ) Notice: Subject to any disclaimer, the term of this patent is extended or adjusted under 35 U.S.C. 154(b) by 15 days.

(21) Appl. No.: 10/214,217

(22) Filed: Aug. 7, 2002

(65) Prior Publication Data

US 2004/0027107 A1 Feb. 12, 2004

(51) Int. Cl.[7] .............................. H02H 3/08; H02H 3/00
(52) U.S. Cl. ......................... 361/93.6; 361/96
(58) Field of Search ................. 323/282, 271, 323/283, 284, 285, 286, 294, 288; 363/56.01, 56.02, 56.03, 56.09, 81–97, 18, 56.11, 19; 361/79, 93.1, 93.6, 94, 96, 91.7; 327/81

(56) References Cited

U.S. PATENT DOCUMENTS

| | | | | |
|---|---|---|---|---|
| 4,309,627 A | * | 1/1982 | Tabata | 327/81 |
| 6,320,359 B1 | * | 11/2001 | Nagaya et al. | 323/224 |
| 6,542,388 B2 | * | 4/2003 | Amei | 363/56.01 |

* cited by examiner

*Primary Examiner*—Rajnikant B. Patel
(74) *Attorney, Agent, or Firm*—Trexler, Bushnell, Giangiorgi, Blackstone & Marr Ltd.

(57) ABSTRACT

A power supply feedthrough protection circuit which solves the problem of voltage feedthrough from a bus cable charging a chip power-supply beyond acceptable transistor limits. The circuit continuously senses the chip power-supply, compares the supply to an acceptable threshold, and provides a low-impedance current path as soon as the power-supply exceeds the threshold. The circuit allows a driver to draw current from the cable, in a controlled manner, and provides that the power supply is therefore never allowed to exceed the maximum allowable limit for transistors.

16 Claims, 1 Drawing Sheet

POWER-SUPPLY FEEDTHROUGH PROTECTION CIRCUIT FOR 5-VOLT FAILSAFE CMOS DRIVERS

BACKGROUND

Figure 1:
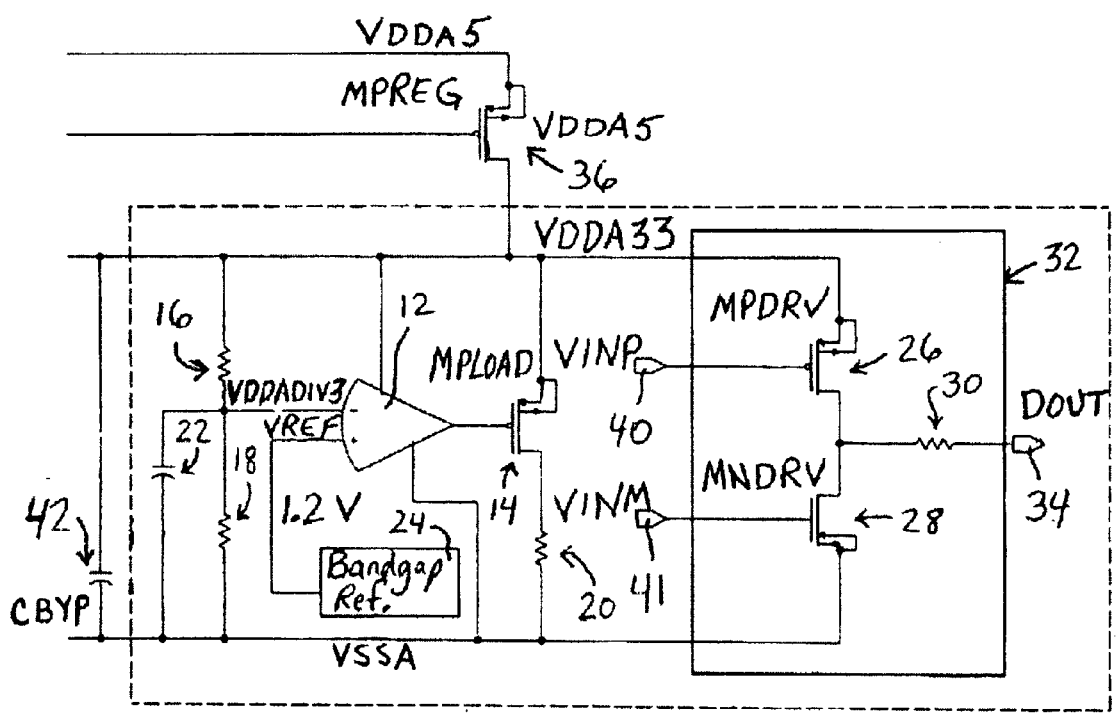

The present invention generally relates to sub-micron CMOS serial bus transceiver chips that are supplied power by means of a voltage regulator on a printed-circuit board (PCB).

The transceiver may be required to withstand a fault condition whereby its output is accidentally shorted to the 5 v power supplied by a bus cable. The transceiver and all other circuitry (related and unrelated) on the chip must not be damaged during the fault condition.

When the driver is back-driven by the cable, there are two low-impedance feedthrough paths available for the cable to charge-up the PCB power supply. One is through the pfet (p-channel field effect transistor) transistor channel, and the other is through the pfet drain-well diode, which may become forward biased. Since the power-supply regulator is typically not designed to sink current, it will present a high DC impedance to the cable power, and eventually charge up to the cable voltage. Therefore, all devices on the chip with the transceiver will potentially be exposed to damaging overvoltage conditions. The p-channel fets in present sub-micron CMOS processes are especially susceptible to long-term degradation from elevated power-supply voltages.

Existing approaches to protecting devices form voltage feedthrough onto the power supply employ comparison circuits that sense the voltage on the transceiver output rather than its power supply. These comparison circuits control the well and gate of the driver pfet transistor to shut off the feedthrough paths by means of additional fet (field effect transistor) switches. The comparison circuitry and gate/well control switches may themselves create new sensitivities to overvoltages, therefore necessitating their own protection circuitry. The final circuit implementations can often be complicated and time-consuming to verify. Another drawback of this approach is that it eliminates the clamping action of the driver pfet, often necessitating use of additional, costly processing step to implement a diode.

OBJECTS AND SUMMARY

A general object of an embodiment of the present invention is to provide a power supply feedthrough protection circuit which effectively solves the problem of voltage feedthrough from the bus cable charging the chip power-supply beyond the acceptable transistor limits.

Another object of an embodiment of the present invention is to provide a power supply feedthrough protection circuit which continuously senses the chip power-supply, compares the supply to an acceptable threshold, and provides a low-impedance current path as soon as the power-supply exceeds the threshold.

Still another object of an embodiment of the present invention is to provide a power supply feedthrough protection circuit which allows a driver to draw current from a cable, in a controlled manner.

Still yet another object of an embodiment of the present invention is to provide a power supply feedthrough protection circuit which provides that a power supply is never allowed to exceed a maximum allowable limit for transistors.

Briefly, and in accordance with at least one of the foregoing objects, an embodiment of the present invention provides a power supply feedthrough protection circuit which includes means for continuously sensing a chip power supply, means for dividing the chip power supply to a reduced voltage to be compared to the reference voltage, means for comparing the reduced voltage to the reference voltage to determine whether the chip power supply exceeds an acceptable threshold, and means for providing a low-impedance current path when it is determined that the chip power supply exceeds the threshold.

BRIEF DESCRIPTION OF THE INVENTION

The organization and manner of the structure and operation of the invention, together with further objects and advantages thereof, may best be understood by reference to the following description, taken in connection with the accompanying drawing, wherein FIG. 1 is a schematic diagram of a power supply feedthrough protection circuit which is in accordance with an embodiment of the present invention.

DESCRIPTION

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

FIG. 1 shows (schematically) a power supply feedthrough protection circuit 10 which is in accordance with an embodiment of the present invention. The circuit 10 effectively solves the problem of voltage feedthrough from the bus cable charging the chip power-supply beyond the acceptable transistor limits. It does this by continuously sensing the chip power-supply, comparing the supply to an acceptable threshold, and providing a low-impedance current path as soon as the power-supply exceeds the threshold. The circuit allows a driver to draw current from the cable, in a controlled manner, and provides that the power supply is therefore never allowed to exceed the maximum allowable limit for transistors.

As shown in FIG. 1, the circuit 10 includes an amplifier 12, a transistor 14 ("MPLOAD"), resistors 16, 18 and 20, capacitor 22, and a precision bandgap voltage reference 24 (providing "VREF" which may be 1.2 volts). Transistors 26 ("MPDRV") and 28 ("MNDRV"), and resistor 30 comprise a voltage driver 32 that may have a 5 volt short-circuit fault condition on its output 34 ("DOUT"). Resistor 30 is a series termination resistor designed in combination with other circuitry to match to the cable impedance. It may be either on-chip or off-chip. Transistor 36 ("MPREG") represents the output of a regulator on the printed circuit board (PCB).

In FIG. 1, "VDDA33" is a 3.3 volt chip power supply, "VDDADIV3" is one-third the chip power supply and "VSSA" is ground. "VDDA5" is a board supply from which the 3.3 volts is derived through the regulator (i.e., transistor 36 ("MPREG")). It may or may not be the same as the cable bus power, depending on whether the board has its own supply or is powered off of the bus. Standards such as USB allow for either possibility. Inputs 40 ("VINP") and 41 ("VINM") are the control signals for the driver 32 (i.e., transistors 26 ("MPDRV") and 28 ("MNDRV")). They are digital signals which are directly related to the data being driven on DOUT. "VINP"/"VINM" are generated in upstream logic. The cable is connected to output 34 ("DOUT"), and is normally connected at the other end to the appropriate data pin of another transceiver. In the fault condition, output 34 ("DOUT") would accidently be connected to the bus power (5V).

During normal operation, output 34 ("DOUT") is driven to ground when the gate of transistor 28 ("MNDRV") is driven to VDDA33. Alternatively, output 34 ("DOUT") can be driven high by forcing the gate of transistor 26 ("MPDRV") to VSSA. Output 34 ("DOUT") will therefore, by design, never exceed VDDA33, and no devices (i.e., transistors 26 ("MPDRV") and 28 ("MNDRV")) are damaged. In the fault condition, output 34 ("DOUT") is connected to 5 volt cable power. If input 40 ("VINP") is low, the channel of transistor 26 ("MPDRV") conducts current from the cable to VDDA33, charging it up. If the gate of transistor 26 ("MPDRV") is at VDDA33, the drain-well diode can still turn on and present a feedthrough path. The value of resistor 30 is designed such that when input 40 ("VINP") is at ground, sufficient voltage is dropped across resistor 30 to prevent the gate-drain voltage of transistor 26 ("MPRV") from exceeding the maximum allowed for the technology.

The resistor divider 16, 18 sets the acceptable threshold for VDDA33. Capacitor 22 provides bandlimiting to prevent normal switching noise from triggering the protection circuit. Amplifier 12 compares the divided power-supply to a bandgap reference ("VREF"). When the threshold is exceeded, transistor 14 ("MPLOAD") turns on and provides a path for current to flow from output 34 ("DOUT"), to ground. This closed-loop feedback path maintains VDDA33 at a safe level to prevent device damage. Resistor 30 limits the current in transistors 14 ("MPLOAD") and 26 ("MPDRV"). The feedback loop is compensated by off-chip bypass capacitance CBYP provided by capacitor 42 on the VDDA33 node.

As shown in FIG. 1, the p-channel field effect transistor 26 ("MPDRV") has its source and/or well connected to VDDA33 and a current path is provided from the output 34 ("DOUT") through the p-channel field effect transistor 26 ("MPDRV") source and/or well to VDDA33. The circuit 10 shown in FIG. 1 is advantageous because only the driver devices themselves, i.e., transistors 26 ("MPDRV") and 28 ("MNDRV"), can ever have 5-volts on one of their terminals. The feedback control loop inherent in the circuit 10 guarantees this operation. Alternative, prior art solutions rely on the pad voltage itself to turn off devices, which in itself creates susceptibility to damage. Another benefit of the circuit 10 shown in FIG. 1 is that is does not interfere with the clamping action of the driver pfet drain-well diode. Therefore, it is not necessary to implement a Zener diode for transient overvoltage protection, which would add cost.

With regard to specific values, resistor 16 may be a 100 kilo ohm resistor, resistor 18 may be a 50 kilo ohm resistor, resistor 20 may be a 30 ohm resistor, capacitor 22 may be a 10 pico Farad capacitor and capacitor 42 may be a 1 micro Farad capacitor.

While an embodiment of the present invention is shown and described, it is envisioned that those skilled in the art may devise various modifications of the present invention without departing from the spirit and scope of the appended claims.

For example, while FIG. 1 illustrates an embodiment where the driver 32 includes a pair of transistors 26 ("MPDRV") and 28 ("MNDRV")—specifically a p-channel field effect transistor 26 and an n-channel field effect transistor 28—this embodiment is not the only one that can be employed. Specifically, there need not be an n-channel field effect transistor (28, "MNDRV"). For instance, transistor 28 could be replaced with a resistor to ground. In addition the gate of the p-channel field effect transistor 26 ("MPDRV") need not be driven to ground during a "high" on the cable. When output 34 ("DOUT") is driven high, the gate of p-channel field effect transistor 26 ("MPDRV") could be driven anywhere between ground and VDDA33-|Vtp|, where Vtp is the threshold voltage of the p-channel field effect transistor 26 ("MPDRV"). In such case, the p-channel field effect transistor 26 ("PDRV") would still have its source or well connected to VDDA33 and a current path from the output 34 ("DOUT") through the p-channel field effect transistor 26 ("MPDRV") source and/or well to VDDA33.

What is claimed is:

1. A power supply feedthrough protection circuit configured to receive a chip power supply, a reference voltage, and driver control signal, and configured to provide an output, said power supply feedthrough protection circuit comprising: a resistor divider which is configured to receive the chip power supply and divide the chip power supply to a reduced voltage to be compared to the reference voltage; means for comparing the reduced voltage to the reference voltage to determine whether the chip power supply exceeds an acceptable threshold; a driver which includes a pair of transistors and a series termination resistor, said pair of transistors comprising an n-channel transistor and a p-channel transistor and configured to receive the driver control signals; and means for providing a low-impedance current path when it is determined that the chip power supply exceeds the threshold.

2. A power supply feedthrough protection circuit as recited in claim 1, further comprising an amplifier which is configured to receive the reduced voltage and the reference voltage.

3. A power supply feedthrough protection circuit as recited in claim 2, wherein the amplifier has an output and the circuit further comprises a transistor which is connected to the output of the amplifier and is configured to turn on and provide a path for current to flow from the output of the circuit, to ground.

4. A power supply feedthrough protection circuit as recited in claim 1, further comprising a capacitor configured to provide bandlimiting to prevent normal switching noise from triggering the circuit.

5. A power supply feedthrough protection circuit as recited in claim 1, further comprising a device for providing the reference voltage.

6. A power supply feedthrough protection circuit as recited in claim 1, further comprising an amplifier which is configured to receive the reduced voltage and the reference voltage, wherein the amplifier has an output and the circuit further comprises a first transistor which is connected to the output of the amplifier and is configured to turn on and provide a path for current to flow from the output of the circuit, to ground, said circuit further comprising a driver which includes a second transistor connected to a series termination resistor, said resistor configured to limit the current in the first and second transistors.

7. A power supply feedthrough protection circuit as recited in claim 1, wherein the circuit is configured to operate in a fault and a non-fault condition, wherein in the non-fault condition the output of the circuit is driven to ground when the gate of one of the transistors of the driver is driven to the chip power supply.

8. A power supply feedthrough protection circuit as recited in claim 1, wherein the circuit is configured such that in the fault condition, the output of the circuit is connected to a voltage from which the chip voltage supply is derived.

9. A power supply feedthrough protection circuit as recited in claim 1, wherein the circuit is configured to operate in a fault and a non-fault condition, wherein in the non-fault condition the output of the circuit is driven high by forcing the gate of one of the transistors of the driver to ground.

10. A power supply feedthrough protection circuit as recited in claim 9, wherein the circuit is configured such that in the fault condition, the output of the circuit is connected to a voltage from which the chip voltage supply is derived.

11. A power supply feedthrough protection circuit configured to receive a chip power supply, a reference voltage, and driver control signal, and configured to provide an output, said power supply feedthrough protection circuit comprising: a resistor divider which is configured to receive the chip power supply and divide the chip power supply to a reduced voltage to be compared to the reference voltage; an amplifier which is configured to receive the reduced voltage and the reference voltage, wherein the amplifier has an output and the circuit further comprises a transistor which is connected to the output of the amplifier and is configured to turn on and provide a path for current to flow from the output of the circuit, to ground, said circuit, further comprising a driver which includes a pair of transistors and a series termination resistor, said pair of transistors comprising an n-channel transistor and a p-channel transistor and configured to receive the driver control signals, said circuit further comprising a capacitor connected to the resistor divider, said capacitor configured to provide bandlimiting to prevent normal switching noise from triggering the circuit, wherein the circuit is configured to operate in a fault and a non-fault condition, wherein in the fault condition, the output of the circuit is connected to a voltage from which the chip voltage supply is derived.

12. A power supply feedthrough protection circuit configured to receive a chip power supply, a reference voltage, and driver control signals, and configured to provide an output, said power supply feedthrough protection at comprising means for continuously sensing the chip power supply; means for comparing the chip power supply to the reference voltage to determine whether the chip power supply exceeds an acceptable threshold; and a p-channel field effect transistor having its source and/or well connected to the chip power supply and a current path from the output through the p-channel transistor's source and/or well to the chip power supply.

13. A power supply feedthrough protection circuit as recited claim 12, further comprising a resistor divider which is configured to receive the chip power supply and divide the chip power supply to a reduced voltage to be compared to the reference voltage.

14. A power supply feedthrough protection circuit as recited in claim 12, further comprising an amplifier which is configured to receive the reduced voltage and the reference voltage.

15. A power supply feedthrough protection circuit as recited in claim 14, wherein the amplifier has an output and the p-channel field effect transistor is connected to the output of the amplifier and is configured to turn on and provide a path for current to flow from the output of the circuit, to ground.

16. A power supply feedthrough protection circuit as recited in claim 12, further comprising a capacitor configured to provide bandlimiting to prevent normal switching noise from triggering the circuit.

* * * * *